Figure 1:
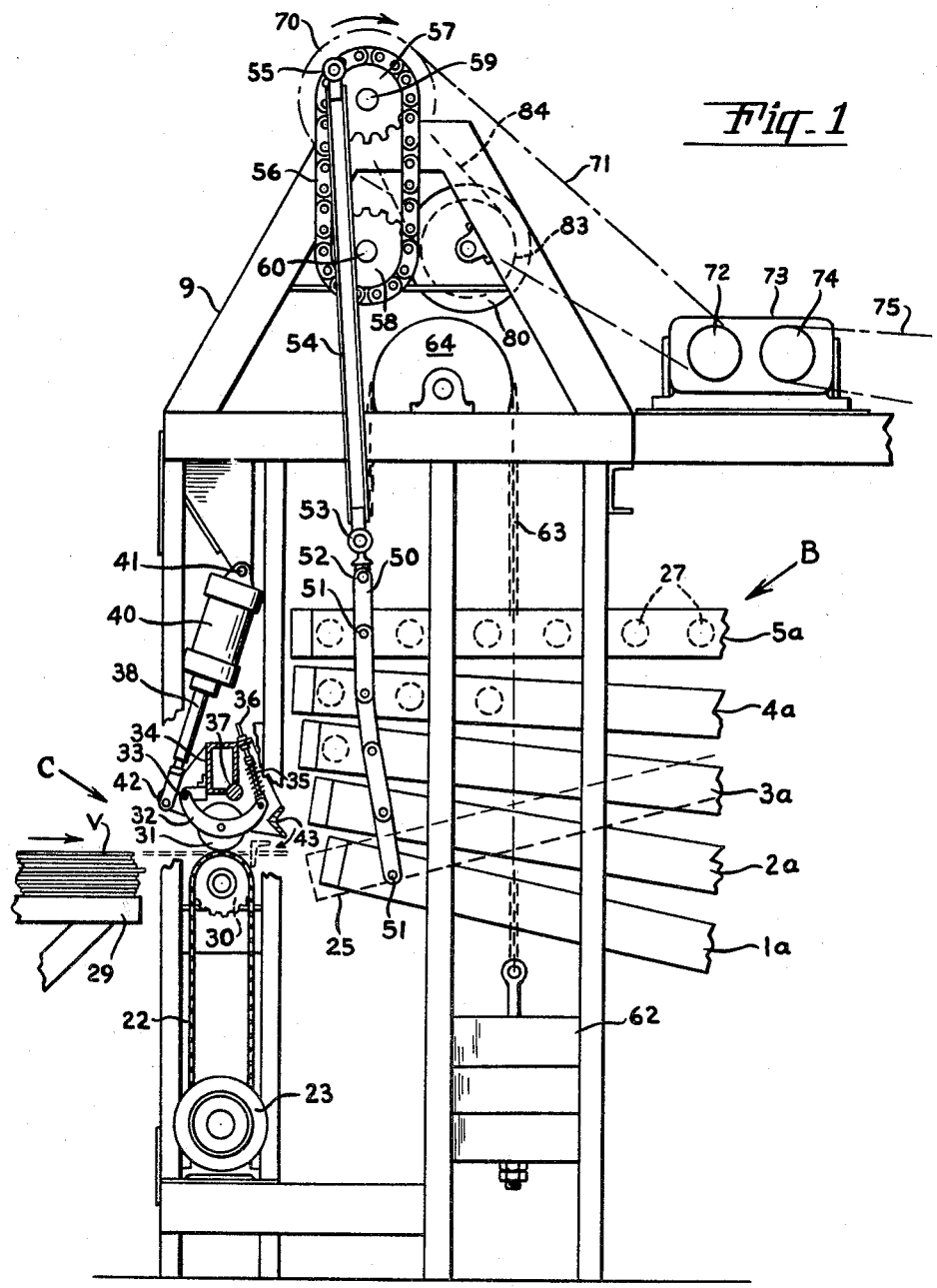

March 2, 1965

V. E. KEENEY 3,171,531

VENEER FEEDER

Filed Aug. 13, 1962

5 Sheets-Sheet 1

INVENTOR.
VADERON E. KEENEY
BY
*Lee R. Schermerhorn*
Attorney

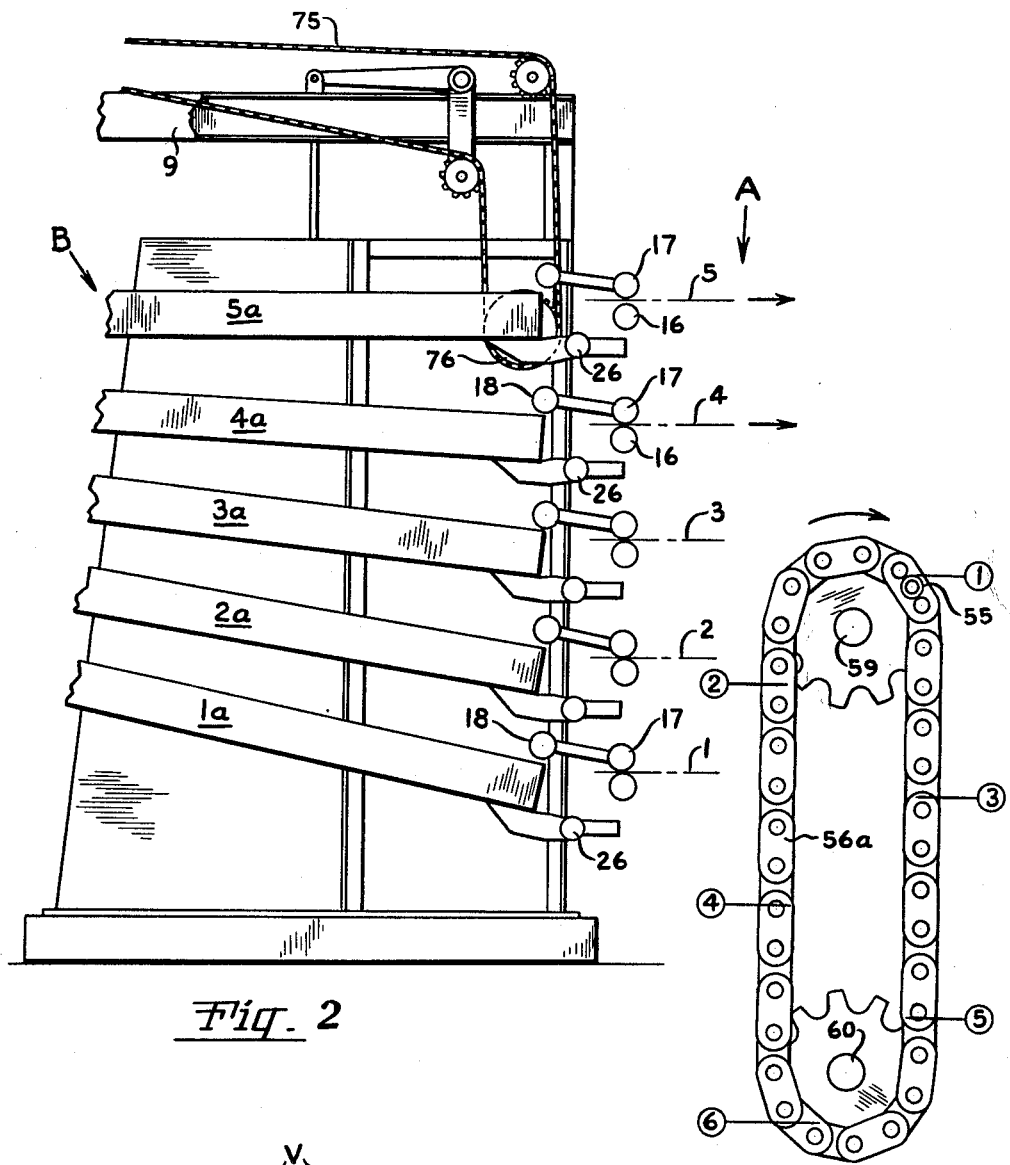
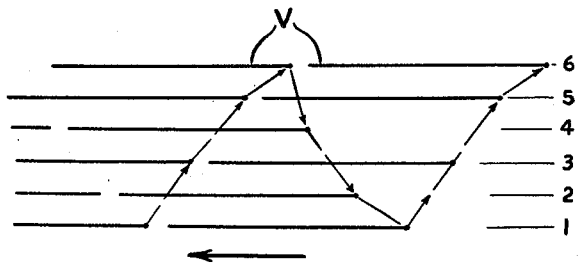

March 2, 1965  V. E. KEENEY  3,171,531
VENEER FEEDER
Filed Aug. 13, 1962  5 Sheets-Sheet 4
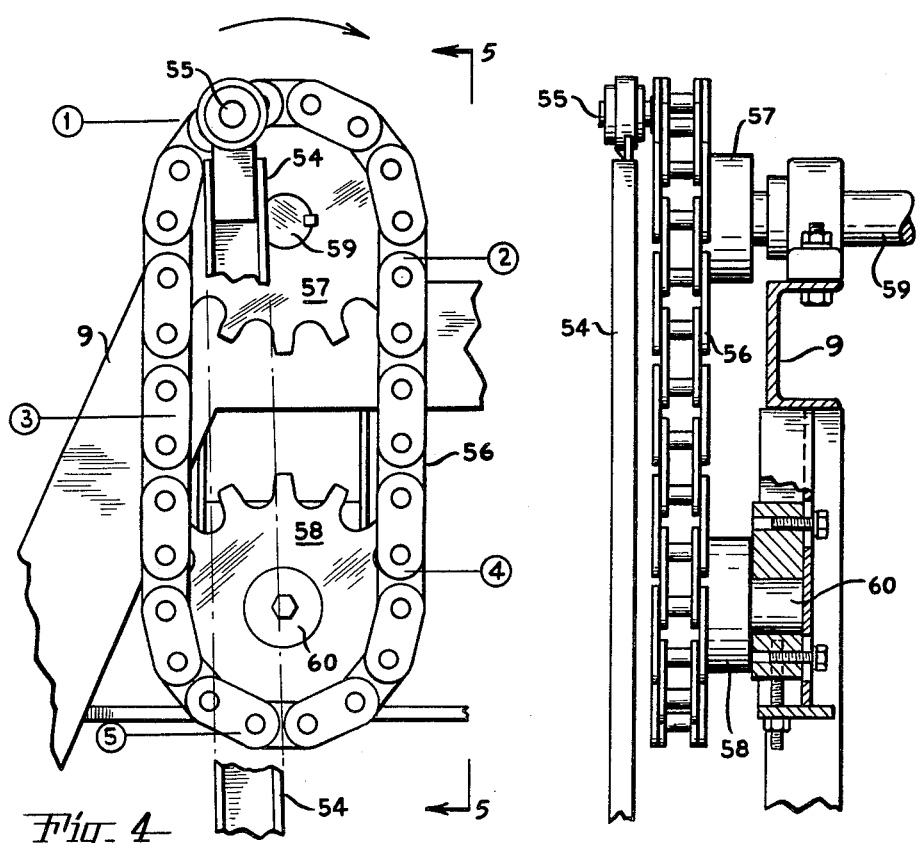
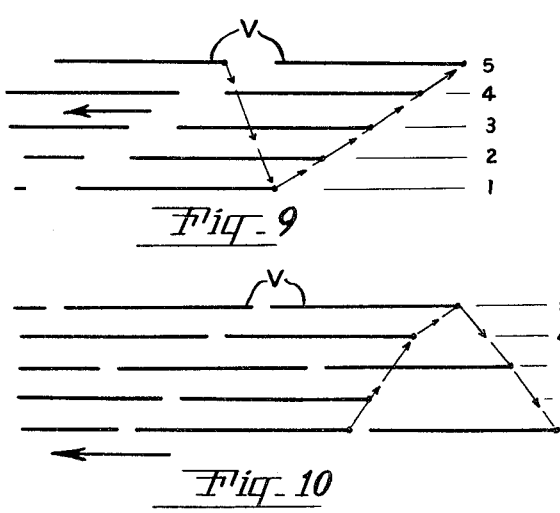
INVENTOR.
VADERON E. KEENEY
BY
*R. R. Schermerhorn*
Attorney

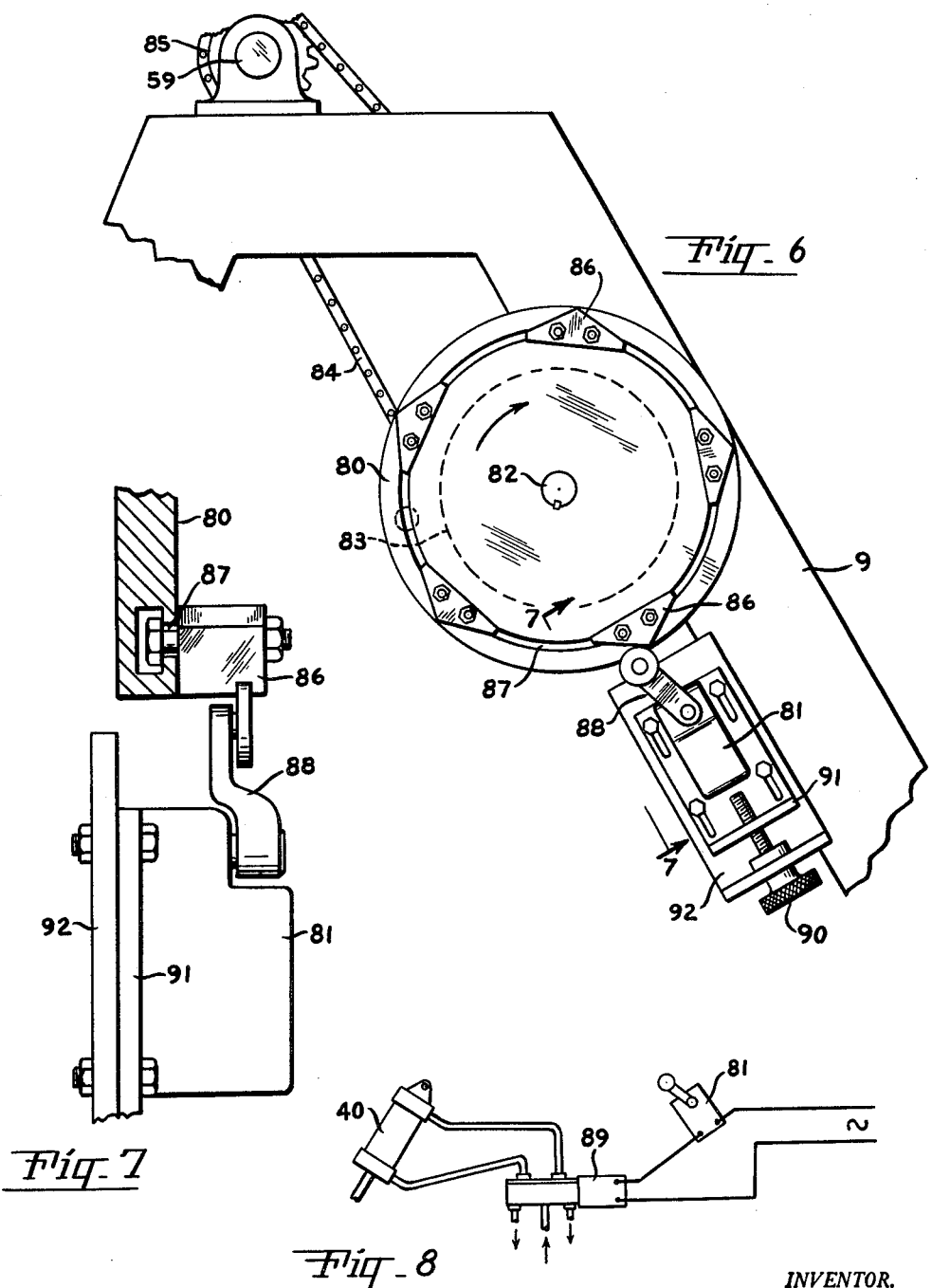

United States Patent Office 3,171,531
Patented Mar. 2, 1965

3,171,531
VENEER FEEDER
Vaderon E. Keeney, Rte. 2, Box 249–C, Eugene, Oreg.
Filed Aug. 13, 1962, Ser. No. 216,634
12 Claims. (Cl. 198—20)

This invention relates to apparatus for feeding veneer to a multiple deck conveyor type veneer drier.

The present feeder involves certain improvements over the feeders shown in the Fields Patent No. 3,011,619 issued December 5, 1961. This type of feeder comprises a plurality of vertically spaced power driven conveyors having their discharge ends aligned with respective conveyor decks of the drier. Power operated pinch rolls adjacent to the infeed ends of the feeding conveyors start the veneer sheets moving toward the drier at the proper intervals. The feeding conveyors are pivotally mounted at their discharge ends so that the infeed ends may be moved vertically for alignment one after another with the pinch rolls for feeding sheets to the decks of the drier in sequence. Conventionally, the feeding conveyors are fed from the pinch rolls in sequence during only the up movement or the down movement and then accelerate for a rapid return movement to start a new feeding sequence. The present invention resides primarily in improved means for imparting the necessary vertical movement to the infeed ends of the feeding conveyors and to a novel and improved feeding sequence and feeding pattern in the drier which is made possible thereby.

Objects of the invention are to provide a feeder which will utilize the capacity of a multiple deck conveyor type drier to better advantage, to provide a feeder which raises and lowers the feeding conveyors in continuous movement so as to avoid starting and stopping of the mechanism at each feeding level, and to avoid a rapid return movement as is ordinarily required in conventional feeders, to provide a feeder which feeds during both up and down movements of the feeding conveyors, to provide a skip feeder wherein the decks of the drier are not all fed in sequence, to provide an improved pinch roll assembly and to provide a feeder having less complicated mechanism and fewer operating parts whereby the feeder is less costly to manufacture and more trouble free in operation.

In the present feeder the vertically movable infeed ends of the feeding conveyors are hung from projecting studs or trunnions on links of a pair of endless chains trained around upper and lower sprocket wheels on opposite sides of the machine. The chains are driven at a speed proportional to the conveyor speed in the drier and are in continuous motion raising and lowering the infeed ends of the feeding conveyors continuously up and down past the pinch rolls. Synchronized timing mechanism is provided for operating the pinch rolls at the proper intervals for introducing veneer sheets onto the infeed ends of the feeding conveyors as they come into alignment with the pinch rolls, the latter feeding on the fly during both downward and upward movement of the feeding conveyors. The timing control is accomplished by a single cam operated in contrast to the intricate control system having many switches in conventional feeders.

The pinch rolls are controlled in accordance with the speed of the drier conveyors and supply the feeding conveyors alternately, or skip feed, in portions of the feeding cycle whereby the feed movements of the pinch rolls are initiated at substantially equal time intervals and no time is lost in returning the feeding conveyors back to a starting position relative to the pinch rolls. Also, it is not necessary to accelerate the raising and lowering mechanism during return travel in order to avoid such loss of time; the feeding conveyors move up and down at uniform speed as controlled by the speed of the drier conveyors. The feeding of the sheets at approximately uniform intervals of time allows them to be delivered into the drier with less space between successive sheets thereby reducing waste space in the drier and more fully utilizing its capacity.

The foregoing and other objects and advantages will become apparent and the invention will be more fully understood from the following detailed description of certain preferred embodiments of the invention illustrated in the accompanying drawings. Various changes may be made, however, in the details of construction and arrangement of parts and all such modifications within the scope of the appended claims are included in the invention. Also, the present feeder mechanism may be used for other materials or objects and is not limited to use with a drier oven. It may be used with any multiple deck conveyor machine.

Figure 3:
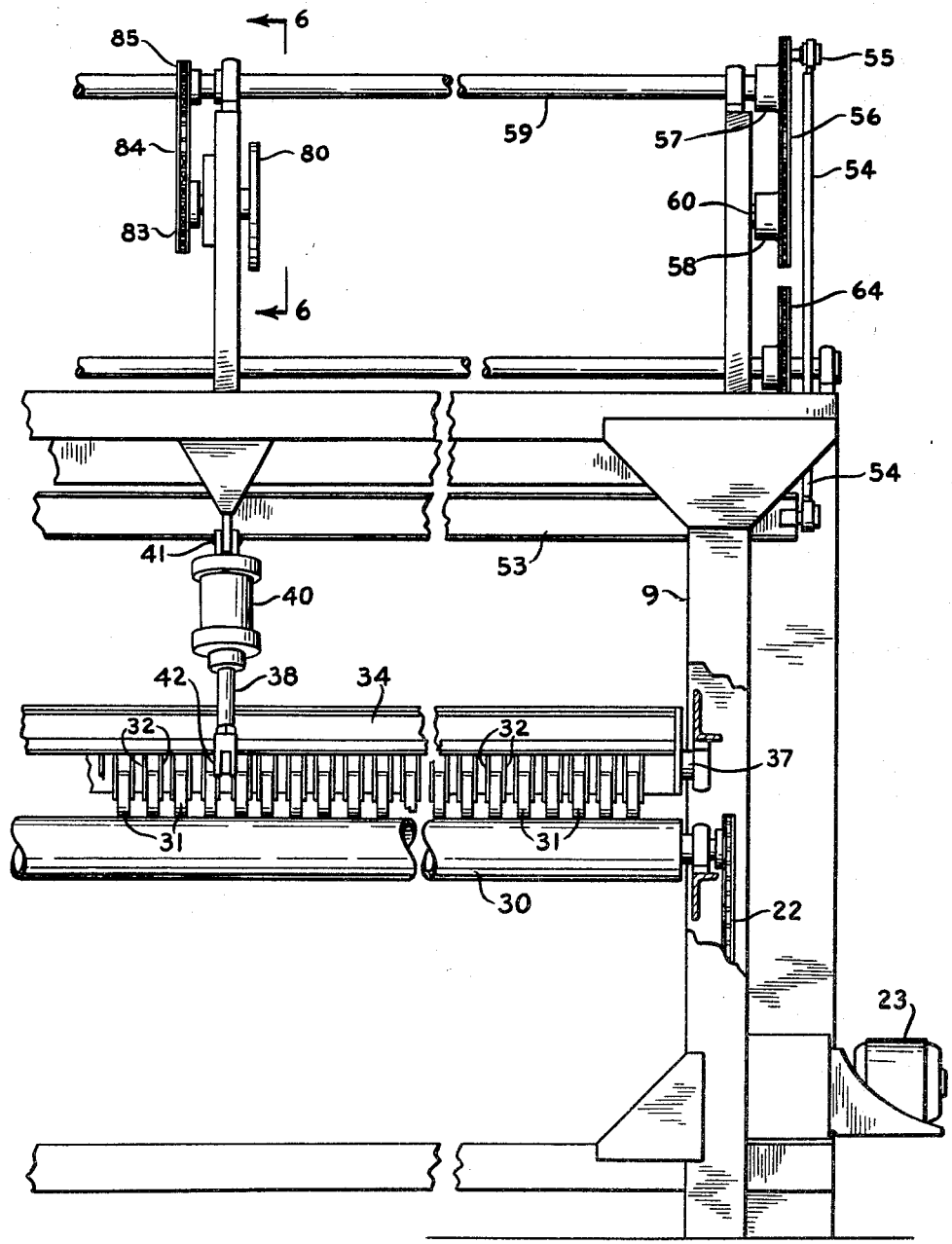

In the drawings:
FIGURE 1 is a side elevation view with parts broken away, showing the infeed end of a veneer embodying the principles of the invention;
FIGURE 2 is a view in continuation of FIGURE 1, showing the discharge end of the feeder;
FIGURE 3 is a fragmentary front elevation view of the apparatus shown in FIGURE 1;
FIGURE 4 is an enlarged fragmentary view of the endless chain drive for raising and lowering the infeed ends of the feeding conveyors;
FIGURE 5 is a view taken on the line 5—5 of FIGURE 4;
FIGURE 6 is an enlarged fragmentary view of the cam wheel and timing switch for the pinch rolls;
FIGURE 7 is a view taken on the line 7—7 of FIGURE 6;
FIGURE 8 is a schematic diagram of the electric and pneumatic control circuits for timing the operations of the pinch rolls;
FIGURE 9 is a diagram illustrating a conventional feeding pattern for a five deck drier;
FIGURE 10 is a similar diagram showing the feeding pattern of the present feeder;
FIGURE 11 is a view similar to FIGURE 4 showing an endless chain drive in a feeder for a six deck drier; and
FIGURE 12 is a diagram showing the feeding pattern for a six deck drier according to the invention.

In FIGURE 2 a conventional five deck veneer drier A is represented by the veneer levels in the five decks. The conveyor rollers of the respective decks are represented by the bottom rollers 16. Each deck is also provided at its infeed end with a top roller 17 or a pair of top rollers 17 and 18 which cooperate with the bottom rollers 16 to assist in guiding and feeding the veneer into the drier. All of these rollers are continuously driven by a motor to advance the veneer sheets in the direction of the arrows. It is not necessary to illustrate and describe further details of the drier because such machines are well understood in the art.

The feeder comprises a plurality of decks of roller conveyors B and a pinch roll mechanism C shown in FIGURE 1. The roller conveyors 1a, 2a, 3a, 4a and 5a each have an outfeed end in register with one of the drier decks. These outfeed ends of the feeder conveyors are pivotally supported on shafts 26 so that the infeed ends may be raised and lowered in vertical movement. Each deck of the feeder conveyors is equipped with rollers 27 driven from the drier conveyors by sprocket wheels and chains, not shown, for rotation at drier conveyor speed so that veneer on the feeder decks is moved to the drier at the same speed at which the veneer moves through the drier. The structure thus far described is substantially the same as in the Fields Patent 3,011,619.

Referring now to FIGURE 1, a stack of veneer V to be dried is supported on an automatic elevator platform 29 in front of the feeder. This platform is a conventional device equipped with automatic control mechanism to raise the platform gradually as sheets of veneer are removed from the top of the stack so that the top sheet of veneer will always be on a level with the pinch rolls. The sheets are manually removed from the stack and introduced between the pinch rolls.

The pinch rolls 30 and 31 of pinch roll assembly C are arranged to close together at predetermined intervals to grip a sheet of veneer and feed it onto one of the decks of the feeder conveyors B. The lower pinch roll 30 is mounted in a fixed position in a frame 9 and driven continuously by a chain 22 from a motor 23. The upper pinch roll 31 preferably comprises a series of individual idle rollers, as shown in FIGURE 3, and is mounted to be raised and lowered for timing the introduction of the sheets to the feeder conveyors B. Both the lower roll and the idle rollers of the upper roll are preferably rubber covered to grip and apply traction to the sheets.

The shaft of each roller comprising the upper pinch roll 31 is mounted between a pair of arms 32 which are pivotally connected at 33 with a movable rocker frame 34. Thus, the rollers may individually adjust themselves to irregularities and variations in the thickness of the veneer by causing the arms 32 to pivot upwardly against the resistance of compression springs 35. The downward limit of movement of each pair of arms 32 is controlled by a bolt 36 connected at its upper end to the rocker frame 34.

Rocker frame 34 is mounted for rotation on a horizontal shaft 37. This frame is rotated counterclockwise to the position shown in full lines for feeding veneer by means of a piston rod 38 in a cylinder 40. The upper end of cylinder 40 is pivotally mounted at 41 on the frame 9 and the lower end of the piston rod is pivotally connected with rocker frame 34 at 42. A rear portion of rocker frame 34 carries a veneer stop 43.

The pinch rolls are moved to open position by retraction of the piston rod 38 into cylinder 40 swinging the upper pinch roll 31 upwardly and forwardly (left in FIGURE 1) away from the lower pinch roll 30. In this position of rocker frame 34 the stop 43 moves down to its broken line position to limit the distance of insertion of veneer between the pinch rolls. Then, when piston rod 38 is actuated downward, the stop 43 is lifted as shown and the upper pinch roll 31 clamps the veneer sheet against the bottom roll 30 to cause the sheet to be moved onto one of the feeder conveyors B. For this purpose the upper pinch roll 31 is preferably an idle roll, as described, movement of the veneer occurring by reason of its traction against the driven roll 30 when the pinch rolls close.

The feeder conveyors 1a to 5a are supported at their infeed ends by a pair of jointed hanger arms 50 on opposite sides of the machine. Each hanger arm is made up of a plurality of sections or links pivotally connected to each other and to the conveyor frames by pins 51. The upper ends of the two hanger arms are pivotally connected at 52 with the oposite ends of a horizontal spreader bar 53. The ends of spreader bar 53 are supported for vertical movement by a pair of upper hanger arms 54. Each hanger arm 54 is pivotally supported at its upper end on a stud or trunnion 55 projecting laterally from a link of an endless chain 56.

Each chain 56 is trained around upper and lower sprocket wheels 57 and 58 on the respective shafts 59 and 60. These shafts are supported in suitable bearings on the frame 9 of the feeder. The weight of conveyors 1a to 5a is supported by a pair of counterbalances 62 each connected with a chain 63. The two chains 63 pass over pulleys 64 on opposite sides of the machine and are connected with the opposite ends of spreader bar 53.

Shaft 59 is driven continuously by a sprocket wheel 70 from a chain 71 on the output sprocket 72 of a variable ratio drive mechanism 73. The input sprocket 74 of this mechanism is driven by a chain 75 from the sprocket wheel 76 in FIGURE 2. This sprocket is driven from the drier conveyors so as to rotate at a speed proportional to the dried and feeder conveyor rollers 16 and 27. Alternatively, the sprocket 70 may be driven through suitable gear reduction by a separate motor which is synchronous with the drier conveyor motor.

The chains 56 are constructed and arranged so that as the trunnions 55 start to pass over the top of sprocket wheels 57, bottom conveyor 1a comes into alignment with the pinch rolls 30 and 31 in position to receive a veneer sheet. At such time the bottom conveyor 1a is inclined downward toward the bottom deck 1 of the drier as shown in full lines in FIGURE 1. Then, as trunnions 55 descend toward the sprocket wheels 58, the other conveyors 2a, 3a and 4a pass through alignment positions with the pinch rolls and, as trunnions 55 reach the bottom sides of sprocket wheels 58, the top conveyor 5a comes into alignment as shown in broken lines.

The vertical movement is minimized by making the infeed ends of the conveyors 1a to 5a convergent whereby the sections or links of hanger arms 50 between their pivotal connections 51 are shorter than the vertical spacing of the drier decks 1 to 5 in FIGURE 2. Thus, the veneer sheets travel uphill on the two uppermost conveyors 4a and 5a and approximately on the level on the middle conveyor 3a. The slopes of the top and bottom conveyors, which have the greatest inclination, are not sufficient to cause the sheets to lose tractive engagement with the rollers 27. It will be apparent that in order to obtain the necessary movement the vertical travel of trunnions 55 must be approximately equal to the vertical distance between the end roller 27 in conveyor 1a and end roller 27 in conveyor 5a.

The timing of the closing of the pinch rolls 30 and 31 is controlled by the cam wheel 80 and switch 81 in FIGURE 6. Cam wheel 80 is keyed to a shaft 82 carrying a sprocket wheel 83. This sprocket wheel is driven continuously by a chain 84 from a sprocket wheel 85 on the shaft 59. Cam wheel 80 is equipped with a number of cam lugs 86 equal to the number of feeder conveyors 1a to 5a. For timing purposes the cam lugs are adjustable circumferentially around a circular slot 87 in the cam wheel. Each time a cam lug actuates the switch lever 88, the solenoid valve 89 in FIGURE 8 is energized to admit air pressure into the upper end of cylinder 40 to close the pinch rolls. Switch 81 is adjustable in a radial direction by means of a screw 90 which is provided to shift switch mounting plate 91 relative to its supporting bracket 92 on a member of the frame 9. This radial adjustment determines the duration of switch closure and hence the length of time that the pinch rolls are closed. When switch 81 re-opens and deenergizes the solenoid valve, the valve's internal spring returns it to a normal position supplying air pressure to the lower end of cylinder 40 to hold the pinch rolls normally open.

FIGURE 9 illustrates a conventional feed pattern in a five deck drier. The conventional feeder may start at the top and feed down or it may start at the bottom and feed up as shown in the diagram. In any event, the decks are fed consecutively or sequentially one after the other, as from 1 to 5. Then, for even feeding, the feeder must move all the way back from deck 5 to deck 1 in the same time interval which elapses in each deck to deck movement. This requires a relative downward movement, or upward movement of the infeed ends of the feeder conveyors, at four times the speed of the deck to deck movement. In order to do this, provision must be made for speeding up the drive motor or changing the drive ratio during the return movement. Also, during the vertical feed movement it is common practice to interrupt the movement at each deck while a sheet is being received from the pinch rolls. Such intermittent movement plus the high speed return requires an elaborate control system which is expensive to manufacture and subject to malfunction in operation, particularly in view of the many switches which are subject to failure from sticking or loss of contact because of dust.

Applicant's improved feed pattern is shown in FIGURE 10. This is referred to as a skip feed pattern since the feeding sequence is seen to be 1, 2, 4, 5, 3, 1. These corresponding deck levels are indicated in FIGURE 4 in relation to the endless chain 56. It will be observed that these station positions as numbered in FIGURE 4 are approximately equal numbers of chain links apart in the designated skip feed sequence progressively around the chain loop. The feeding position for the bottom deck 1 is reached just ahead of top dead center of trunnion 55 on the upper sprocket wheel 57. While the trunnion is passing over the top of the sprocket wheel there is substantially no vertical movement of the feeding conveyors, thereby allowing ample time for the feeding of an eight foot long sheet onto the bottom conveyor 1 from the pinch rolls.

The next sheet is fed onto conveyor 2a for the drier deck 2 while conveyor 2a is moving downward in sheet-receiving registry with the pinch rolls. Then conveyor 3a is skipped and no sheet is fed for drier deck 3 but the pinch rolls are again actuated to feed a sheet to conveyor 4a for the drier deck 4 as the trunnions 55 reach the lower sprockets 58. While the trunnions 55 pass around the undersides of sprockets 58, top conveyor 5a is in registry with the pinch rolls for feeding a sheet onto the top conveyor for the top drier deck 5. After this feeding operation, conveyor 4a which has just been fed is now skipped and the next feeding operation occurs on conveyor 3a for drier deck 3 as trunnions 55 move up in the left-hand vertical reach of the chain. Conveyor 2a for drier deck 2 is then skipped and the next feeding operation is again on conveyor 1a for drier deck 1. Thus, the feeder conveyors feed drier decks 2 and 4 during each downward movement and feed decks 5, 3 and 1 during each upward movement.

The foregoing arrangement of skip feeding provides approximately equal time intervals between successive feeding operations without requiring any acceleration of the chains 56 for a return movement. These chains more continuously and at constant speed. Approximately equal time intervals between successive feed operations are possible because of the small vertical movements of trunnions 55 which occur while the trunnions move over the upper sides of sprockets 57 and around the lower sides of sprockets 58. During these portions of the movement there is no skip feed; the feed progresses directly from deck 1 to deck 2 and directly from deck 4 to deck 5. Each of these intervals is of approximately the same duration as the interval in downward movement of trunnions 55 from the deck 2 position to the deck 4 position and the intervals of upward movement from the deck 5 position to the deck 3 position and from the latter to the deck 1 position.

This pattern of equal time intervals it possible to space the five cam lugs 86 approximately equidistantly from each other around the periphery of cam wheel 80. Slight variations in the intervals result from the straight path of downward movement of trunnions 55 between stations 2 and 4 and the partially arcuate paths of upward movement of the trunnions between stations 5 and 3 and between 3 and 1. The driving ratio for cam wheel 80 is such that the cam wheel makes one revolution for each revolution of trunnions 55 around the sprocket wheels 57 and 58. Thus, the spacing of the cam lugs corresponds, proportionately, to the spacing of stations 1, 2, 4, 5, 3, 1 in FIGURE 4, measured along the chain in skip feed sequence.

With all the time intervals between successive feed operations by the pinch rolls being close to equality, the gaps between successive veneers on each drier deck may be reduced materially without danger of overlap. This increases the capacity of the drier by an amount which becomes significant at the end of a day's run.

It will be apparent that although the feeder conveyors are moving constantly up and down, the reversals of movement are accomplished without shock or vibration. During these reversals the conveyors decelerate and accelerate in smooth simple harmonic motion as trunnions 55 pass around portions of the sprocket wheels.

In operation, sheets of veneer are manually inserted between the pinch rolls as fast as the pinch rolls will take them, the timing being entirely automatic as hereinabove described. When a sheet of veneer is inserted between the normally open pinch rolls, the distance of insertion is determined and made uniform by the movable stop 43 which is then in its lower position shown in dotted lines in FIGURE 1. The sheet will lie on the rotating lower roll 30 abutting and urged gently against the stop 43 until switch 81 is closed by one of the cam lugs 86. When the switch is thus actuated, piston rod 38 is extended downward causing the upper pinch roll 31 to clamp the veneer against the rotating pinch roll 30 and raise the stop 43. The sheet then feeds rapidly onto the feeder conveyor deck which is in position to receive it and the rollers 27 carry the sheet into the corresponding deck of the drier. Switch 81 is adjusted radially by means of screw 90 so that the switch will open and cause the pinch rolls to open at the end of the time required for the length of the sheet to pass through the pinch rolls.

The opening of switch 81 causes the pinch rolls to open and stop 43 to move down to its broken line position placing the parts in readiness to receive another sheet of veneer. As long as each sheet of veneer is inserted between the pinch rolls before they are closed by the next cam lug actuating switch 81, the feeding intervals will be automatically timed and the spacing of the sheets in the drier will be uniform to the degree described without overlap and without any unnecessary gaps. Any delay of a sheet at the pinch rolls will not disturb the timing of the feed to the other decks. The variable ratio drive mechanism 73 permits adjustment of the timing function or both cam wheel 80 and chains 56 so that the gaps between sheets may be adjusted as desired.

Obviously, the veneer sheets must be of uniform length. When the length of the sheets is changed, two adjustments must be made. First, the drive ratio of the driving mechanism 73, or gear reduction from a synchronous motor, must be altered so that the pinch rolls will close at the proper times and the feeder conveyors move up and down at the proper speed to keep the drier full of veneer. For example, if the veneer length is changed from eight feet to four feet, the shaft 59 would have to turn approximately twice as fast in order to feed approximately twice as many sheets into the same space. Second, the switch 81 would have to be adjusted away from the cam wheel 80 so that it would remain closed only half as long for feeding the half length sheets. By these means the feeder may be adjusted to handle any length of sheet within the limitations of the machine and to adjust the gap between sheets on each deck at will.

FIGURES 11 and 12 show an adaptation for a six deck drier. It will be observed that the pinch rolls skip feed from station 1 to 3 and from 3 to 5, feed consecutively from station 5 to station 6, skip feed to station 4 skip feed to station 2 and then feed consecutively back to station 1. Decks 1, 3 and 5 are fed during the downward movement of the feeder conveyors and decks 6, 4 and 2 are fed during the upward movement. The vertical travel of trunnions 55 must be approximately equal to the vertical distance between the end roller 27 of the bottom feeder conveyor and end roller 27 of the top feeder conveyor.

In a six deck feeder the cam wheel 80 would be equipped with six cam lugs 86 and driven at such speed that the cam wheel makes one revolution while the trunnions 55 make one revolution with the chain 56a around the upper and lower sprocket wheels. The interval between decks 1 and 3 and between 6 and 4 is slightly longer than the interval between decks 3 and 5 and between 4 and 2, which variations are not enough to affect the feeding appreciably and are taken into consideration in the timing adjustment of the cam lugs 86 on the cam wheel. The cam lugs are spaced apart proportionately to the spacing of the stations in FIGURE 11 as measured along the chain in sequence 1, 3, 5, 6, 4, 2, 1, these spaces being approximately equal in numbers of chain links.

Although the feeder has been described with reference to a single row of veneer on each conveyor deck, it is to be understood that in practice the feeder is wide enough to accommodate as many rows side by side as the drier is designed to receive.

Having now described my invention and in what manner the same may be used, what I claim as new and desire to protect by Letters Patent is:

1. A sheet feeder for a multiple deck conveyor type machine comprising sheet feed means, conveyor decks extending from the machine to proximity with said feed means, means for effecting continuous relative vertical movement between said feed means and said conveyor decks with the same speed in opposite directions for alignment of said feed means with said decks successively, means for operating said feed means during periods of alignment in both directions of said movement, and means operating at a speed proportional to the machine conveyors for driving said means for effecting vertical movement and for timing said means for operating said feeding means.

2. A sheet feeder as defined in claim 1, said timing means comprising a cam wheel and a switch actuated thereby.

3. A sheet feeder as defined in claim 2, said proportional speed means comprising a driving connection from the machine conveyors.

4. A sheet feeder as defined in claim 1 including means for varying said proportional speed, and means for varying the duration of each operation of said timing means.

5. A sheet feeder for a multiple deck conveyor type machine comprising sheet feed means; conveyor decks extending from the machine to proximity with said feed means; means for effecting continuous relative vertical movement between said feed means and said conveyor decks with the same speed in opposite directions for alignment of said feed means with said decks successively, said last means comprising an endless chain movable continuously in one direction around upper and lower sprocket wheels, a trunnion on a link of said chain, and a lifting arm supported on said trunnion; and means for operating said feed means during periods of alignment in both directions of movement.

6. A veneer feeder for a multiple deck conveyor type machine comprising a pinch roll unit; a conveyor deck assembly comprising a plurality of conveyors each pivotally mounted at its discharge end; a hanger supporting the infeed ends of said conveyors adjacent said pinch roll unit; means for raising and lowering said hanger to move the infeed ends of the conveyors successively into veneer receiving relation with said pinch roll unit in continuous movement at the same speed in opposite directions, said raising and lowering means comprising an endless chain movable continuously in one direction around upper and lower sprocket wheels, and a trunnion on a link of said chain supporting said hanger; and means for timing the operation of said pinch roll unit to feed veneers onto said conveyors in skip feed sequence during periods of alignment of said conveyors with the pinch roll unit in both directions of said movement.

7. A veneer feeder as defined in claim 6 including a shaft for driving said sprocket wheels, said timing means comprising a cam wheel and switch actuated thereby, said cam wheel being driven from said shaft, and means for driving said shaft at a speed proportional to the speed of the machine conveyors.

8. A veneer feeder as defined in claim 7 including means to vary the proportional speed of said shaft and means to adjust the position of said switch relative to said cam wheel in a radial direction.

9. In a feeder for a multiple deck conveyor type machine, a conveyor assembly, feed means arranged to feed said conveyor assembly, drive means arranged to operate continuously at a speed proportional to the conveyor speed of said machine, means operated by said drive means for continuously raising and lowering said conveyor assembly at the same speed up and down, and timing means operated by said drive means for timing the operations of said feed means during both up and down movements of said conveyor assembly.

10. In a feeder for a multiple deck conveyor type machine, a conveyor assembly, feed means for feeding said conveyor assembly, drive means arranged to operate continuously at a speed proportional to the conveyor speed of said machine, an endless chain trained around upper and lower sprockets driven at constant speed in one direction by said drive means, a trunnion on a link of said chain supporting said conveyor assembly for vertical movements up and down with said trunnion, a switch arranged to operate said feed means, and a cam wheel driven by said drive means for actuating said switch during both up and down movements of said conveyor assembly.

11. A feeder for a multiple deck conveyor type machine comprising a plurality of conveyor decks pivotally mounted at their discharge ends, feed means for feeding the infeed ends of said conveyor decks, an endless chain trained around upper and lower sprockets, a trunnion on a link of said chain supporting the infeed ends of said conveyor decks for up and down movements past said feed means, a switch arranged to operate said feed means during said up and down movements, a cam wheel having lugs to actuate said swtich, and drive means operating continuously at a speed proportional to the conveyor speed of said machine for driving said sprockets and cam wheel at constant speed in one direction.

12. In a feeder for a multiple deck conveyor machine, a conveyor assembly, feed means for feeding said conveyor assembly, an endless chain trained around upper and lower sprockets, a trunnion on a link of said chain supporting said conveyor assembly for vertical movements, a switch arranged to operate said feed means, a cam wheel having lugs for actuating said switch during both up and down movements of said conveyor assembly, and drive means operating continuously at a speed proportional to the conveyor speed of said machine for driving said sprockets and cam wheel at constant speed in one direction, said lugs being positioned on said cam wheel to feed said decks consecutively as said trunnion passes around the upper side of the upper sprocket and around the lower side of the lower sprocket and to feed said decks alternately as said trunnion travels between said sprockets.

References Cited by the Examiner
UNITED STATES PATENTS

| 2,799,381 | 7/57 | Beckley | 198—20 |
| 2,846,052 | 8/58 | Heinemann | 198—167 |
| 2,906,393 | 9/59 | West | 198—167 |
| 2,972,423 | 2/61 | Thurnher | 214—16.4 |
| 3,011,619 | 12/61 | Fields | 198—20 |
| 3,033,391 | 5/62 | Schubert | 214—16.4 |
| 3,061,065 | 10/62 | Worthington | 198—20 |
| 3,080,958 | 3/63 | Ensley | 198—20 X |

SAMUEL F. COLEMAN, *Primary Examiner.*

ABRAHAM BERLIN, EDWARD A. SROKA,
*Examiners.*